(12) United States Patent
Young et al.

(10) Patent No.: US 8,036,762 B1
(45) Date of Patent: Oct. 11, 2011

(54) ADAPTIVE COMPENSATION IN DIGITAL POWER CONTROLLERS

(75) Inventors: Chris M. Young, Austin, TX (US); John A. Billingsley, Groesbeck, TX (US); David L. Beck, Manor, TX (US)

(73) Assignee: Zilker Labs, Inc., Austin, TX (US)

( * ) Notice: Subject to any disclaimer, the term of this patent is extended or adjusted under 35 U.S.C. 154(b) by 757 days.

(21) Appl. No.: 12/118,166

(22) Filed: May 9, 2008

Related U.S. Application Data

(60) Provisional application No. 60/917,059, filed on May 9, 2007.

(51) Int. Cl.
G05B 13/02 (2006.01)
(52) U.S. Cl. .............. 700/37; 700/42; 700/54; 700/55; 700/71; 323/283; 715/771
(58) Field of Classification Search .............. 700/37, 700/71, 42, 54, 55; 323/283; 715/771, 971; 708/300
See application file for complete search history.

(56) References Cited

U.S. PATENT DOCUMENTS

| | | | |
|---|---|---|---|
| 6,060,871 | A | 5/2000 | Barker |
| 6,064,187 | A | 5/2000 | Redl et al. |
| 6,191,565 | B1 | 2/2001 | Lee et al. |
| 6,229,292 | B1 | 5/2001 | Redl et al. |
| 6,611,435 | B2 | 8/2003 | Kumar et al. |
| 7,176,668 | B2 | 2/2007 | Oswald et al. |
| 7,268,524 | B2 | 9/2007 | Kase et al. |
| 7,405,546 | B2 | 7/2008 | Amrani et al. |
| 7,423,414 | B1 | 9/2008 | Culpepper et al. |
| 7,535,211 | B2 | 5/2009 | Isham |
| 2004/0145362 | A1 | 7/2004 | Lin et al. |
| 2006/0006854 | A1 | 1/2006 | Oswald et al. |
| 2006/0012356 | A1 | 1/2006 | Kase et al. |
| 2007/0013355 | A1 | 1/2007 | Liao |
| 2007/0035283 | A1 | 2/2007 | Liao |
| 2007/0108947 | A1 | 5/2007 | Liao |

(Continued)

OTHER PUBLICATIONS

Wei et al. "A Fully Digital, Energy Efficient Adaptive Power Supply Regulator" IEEE Journal of Solid State Circuits vol. 34 No. 4, Apr. 1999, pp. 520-528.*

*Primary Examiner* — Albert Decady
*Assistant Examiner* — Steven Garland
(74) *Attorney, Agent, or Firm* — Meyertons Hood Kivlin Kowert & Goetzel, P.C.; Jeffrey C. Hood

(57) ABSTRACT

Complex filters may be used to achieve compensation of a plant, corresponding for example to a power regulator or point-of-load (POL) regulator. Digital filter coefficients may be mapped to analogous poles and zeros, or they may be mapped to values of the quality factor (Q) of the output, frequency, and gain. The plant may be observed and characterized using a network analyzer to generate the Bode plot (or Nyquist plot) for the plant. The digital filter coefficients may be mapped to features that may be identified on the Bode plot (or Nyquist plot) to easily correlate characteristics of the digital filter or digital compensator to the plant characteristics. The mapped features may be adjusted, for example by a user, either manually or by executing one or more optimization algorithms, to achieve the desired results relative to the Bode plot (or Nyquist plot). The mapped features may then be reverse mapped to the digital filter or digital compensator coefficients to fine tune and implement the digital filter or digital compensator.

13 Claims, 17 Drawing Sheets

U.S. PATENT DOCUMENTS

| | | |
|---|---|---|
| 2007/0120547 A1 | 5/2007 | Tateishi et al. |
| 2007/0234078 A1 | 10/2007 | Nguyen |
| 2007/0273348 A1 | 11/2007 | Isham |
| 2008/0278132 A1 | 11/2008 | Kesterson et al. |
| 2008/0291700 A1 | 11/2008 | Huang et al. |
| 2008/0312891 A1* | 12/2008 | Maruyama et al. ............... 703/7 |
| 2009/0128110 A1 | 5/2009 | DeLurio et al. |
| 2009/0309567 A1* | 12/2009 | Morroni et al. ............... 323/283 |

* cited by examiner

ADAPTIVE COMPENSATION IN DIGITAL POWER CONTROLLERS

PRIORITY CLAIM

This application claims benefit of priority of U.S. provisional application Ser. No. 60/917,059 titled "High Performance Power Conversion and Digital Power Control", filed May 9, 2007, which is hereby incorporated by reference in its entirety as though fully and completely set forth herein.

BACKGROUND OF THE INVENTION

1. Field of the Invention

This invention relates to compensation of feedback systems and, more particularly, to adaptive compensation in digital power controllers.

2. Description of the Related Art

The rapid evolution and increased power consumption of commercial integrated circuits, such as microprocessors and graphics processors, has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps).

Traditionally, DC power supplies were designed to convert AC line voltage to one or more DC outputs that would be routed throughout a system to the points of load (POL). However, it may not be practical to route high-current signals throughout a system. To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA.

In many power distribution systems it is typically not enough to just distribute power around a system to the various POLs. Complex electronic systems are generally monitored and controlled to ensure maximum reliability and performance. Functions (power supply features) typically implemented in DPA systems include supply sequencing, hot swap ability, ramp control, voltage programming, load monitoring, tracking, temperature monitoring, fan speed control, phase control, current sharing, switching frequency programmability, and switching clock synchronization, to name a few. There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement glue-logic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system. In an effort to tie all or most of these functions together at the system level, one approach has been to implement the functions in control ICs responsible for controlling respective POL converters. Some of the functionality may also be programmed into a microcontroller that may communicate with attached POL converters over an I2C (inter-IC communication) bus to coordinate control of all POL converters in the system.

DC-to-DC conversion is often performed by switching power regulators, or step-down regulators, converting a higher voltage (e.g. 12V) to a lower value as required by one or more load devices. A common architecture features distribution of the higher voltage to multiple power regulators, each producing a different (or possibly the same) voltage to one or more loads. Switching power regulators often use two or more power transistors to convert energy at one voltage to another voltage. One common example of such a power regulator 100, commonly called a "Buck Regulator" is shown in FIG. 1a. Buck Regulator 100 typically switches a pair of power transistors (108 and 110) in order to produce a square-wave at their common node SW. The produced square-wave can be smoothed out using an LC circuit comprising inductor 112 and capacitor 114 to produce the desired voltage, $V_{out}$. A control loop, comprised of an Error Amplifier 116, a Proportional-Integral-Differential (PID) Filter 102, a Pulse-Width-Modulator (PWM) 104, and an Output Control circuit 106, can be configured to control the duty-cycle of the output square-wave, and hence the resulting value of $V_{out}$.

For analog control, Type III compensation has typically been a popular choice for compensation of voltage mode switching power supplies. Many types and variations of compensation are available for digital control, but one of the most popular has been digital PID compensation, indicated in FIG. 1a by PID Filter 102, which may be configured to perform digital compensation and/or filtering in Regulator 100. In general, digital power control has been used in various instances in the power industry for some time. As the cost of digital controllers decreases, their increased use becomes more apparent, yet their relative value and advantage over more conventional analog controllers has been a matter of debate. The main question at the center of the debate is whether digital control can truly provide any substantive advantage over analog control.

Semiconductor process technology has developed to the point that digital circuitry definitely has a size advantage over analog circuitry. For example, an entire digital microcontroller may be built to the approximate size of a single (small) analog component: a capacitor. In addition, digital technology offers the potential to integrate and incorporate sophisticated control algorithms, which may simply be too complex, too large, or too expensive to implement as analog designs. An example of this problem is illustrated in "optimized dead time control" or ODTC. ODTC is an innovative search algorithm which adjusts the switching dead times to optimize the efficiency of the power converter. Although analog implementations of "adaptive dead time" have been around for some time, they did not include efficiency optimization but merely the prevention of cross conduction.

Another essential element of power supply operation is stability. Because of the complexity of the system stability under poorly defined (or even poorly understood) load and environmental conditions, compensation for stability may well be one of the areas where digital implementation may provide a decided advantage over analog solutions. Because of the computational efficiency and power of digital control, compensation is an area where digital solutions have a distinct performance advantage over analog implementations.

Many other problems and disadvantages of the prior art will become apparent to one skilled in the art after comparing such prior art with the present invention as described herein.

SUMMARY OF THE INVENTION

In one set of embodiments, complex digital filters, or digital compensators may be used to achieve a high degree of compensation of a plant, corresponding for example to a power regulator or point-of-load (POL) regulator. Digital filter (digital compensator) coefficients may be mapped to analogous poles and zeros, or they may be mapped to values of the quality factor (Q) of the filter, frequency, and gain. The plant may be observed and characterized using a network analyzer to generate the Bode plot (or Nyquist plot) for the plant. The digital filter (digital compensator) coefficients may be mapped to features that may be identified on the Bode plot (or Nyquist plot) to easily correlate characteristics of the digital filter (digital compensator) to the plant characteristics. The mapped features may be adjusted, for example by a user, either manually or by executing one or more optimization algorithms, to achieve the desired results relative to the Bode plot (or Nyquist plot). The mapped features may then be reverse-mapped to the digital filter or digital compensator coefficients to fine tune and implement the digital filter or digital compensator.

In one set of embodiments, the corresponding coefficients of a digital compensator intended for stabilizing a power stage circuit (or plant) may be obtained by determining a characteristic frequency of the plant, determining a quality factor of the plant, adjusting a frequency of the digital compensator to match the plant, adjusting a quality factor of the digital compensator to match the plant, adjusting a gain of the digital compensator to achieve desired phase margin and/or gain margin, and/or cross-over frequency, mapping the frequency of the digital compensator, the quality factor of the digital compensator and the gain of the digital compensator to the corresponding set of coefficients, and configuring the digital compensator using the corresponding set of coefficients. All the adjustments to the gain, frequency and quality factor may be performed using a graphical user interface program. In some embodiments, the characteristic frequency of the plant and the quality factor of the plant may be determined using a Bode plot obtained from a network analyzer.

In one set of embodiments, a system may include a point-of-load (POL) regulator comprising a power and drive stage configured to generate a regulated output voltage of the POL regulator, and a digital compensator having a set of coefficients, and configured to compensate the power and drive stage, with the set of coefficients determining the operation of the digital compensator. The system may further include a device, such as a processor, microcontroller or, computer (e.g. personal computer) operable to determine respective values for the set of coefficients that result in matching a quality factor of the digital compensator to a quality factor of the power and drive stage, matching a frequency of the digital compensator to a frequency of the power and drive stage, and a desired phase margin, and/or a desired gain margin, and/or a desired cross-over frequency.

The device may be configured to determine the set of coefficients by executing an algorithm that is configured to set each coefficient of the set of coefficients to a specified respective value measure a present standard deviation of a derivative of phase and/or gain with respect to frequency, compare the present standard deviation with a most recent previously measured standard deviation, update the specified respective value of each coefficient of the set of coefficients based on results of the comparison, until the measured present standard deviation of the derivative of phase and/or gain with respect to frequency indicates that there is no longer a reduction of phase and/or gain deviation. In some embodiments the digital compensator may be a digital proportional-integral-derivative (PID) filter.

BRIEF DESCRIPTION OF THE DRAWINGS

The foregoing, as well as other objects, features, and advantages of this invention may be more completely understood by reference to the following detailed description when read together with the accompanying drawings in which.

Figure 1A:
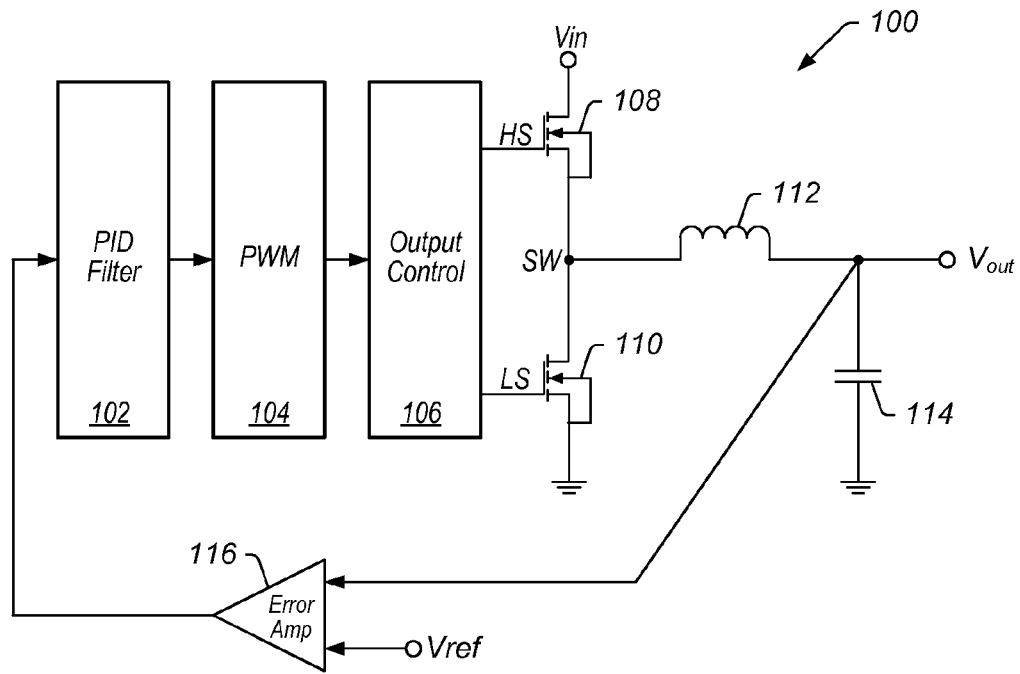
FIG. 1a shows one embodiment of a power regulator (Buck Regulator), according to prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

Incorporation by Reference

U.S. Publication No. 20040201279 titled "Method and apparatus for improved DC power delivery management and configuration" and filed on Apr. 8, 2004, whose inventor is James W. Templeton, is hereby incorporated by reference in its entirety as though fully and completely set forth herein.

U.S. patent application Ser. No. 11/198,698 titled "Method For Using A Multi-Master Multi-Slave Bus For Power Management" and filed on Aug. 5, 2005, whose inventors are Kenneth W. Fernald, James W. Templeton and John A. Wishneusky, is hereby incorporated by reference in its entirety as though fully and completely set forth herein.

U.S. patent application Ser. No. 12/118,358 titled "High Performance Power Conversion and Digital Power Control" and filed on May 9, 2008, whose inventor is Chris M. Young, is hereby incorporated by reference in its entirety as though fully and completely set forth herein.

As previously mentioned, one example of a feedback system may be directed to DC-to-DC conversion, which may be performed by a switching power regulator using two or more power transistors, which may operate to convert energy at one voltage to another voltage. In general, as used herein, the terms "voltage regulator" and "point-of-load (POL) regulator" are used interchangeably to refer to a device configured to perform voltage conversion, and which may include not only feedback control circuitry, but also additional control circuitry configured to perform one or more functions related to power regulation and control, in addition to performing voltage conversion. A POL regulator may also be divided into the voltage converter section, which essentially comprises an output stage of the POL regulator, and control circuitry, which may comprise all other functionality of the POL regulator, including the regulating and control functions. In one set of embodiments, the control circuitry may be implemented on an integrated circuit, and coupled to an external output stage to construct a complete POL regulator. One power regulator, a Buck Regulator, was shown in FIG. 1a. In general, transistors 108 and 110 may be controlled such that they do not conduct current at the same time. Typically, when transistor 108 is turned on (HS is asserted), transistor 110 may be turned off (LS is de-asserted).

Figure 1B:
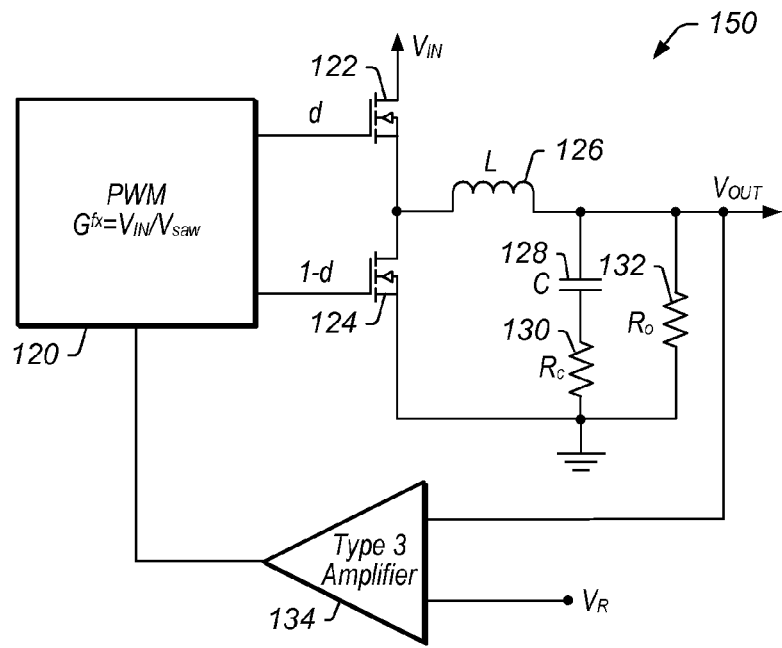
FIG. 1b shows one embodiment of a simplified switching power converter.

FIG. 1b illustrates a simplified power converter (power regulator) 150, similar to Regulator 100 shown in FIG. 1a. Power converter 150 may consist of a PWM controller 120 with a fixed modulation gain of $G_{fix}$, high-side and low-side switches 122 and 124, respectively, an output stage consisting of an inductor 126 and one or more capacitors 128, a load 132, and a feedback or control loop. It should be noted that depending on how the functionality of power regulator 150 is divided, high-side switch (HS FET) 122 and low-side switch (LS FET) 124 may also be considered a part of the output stage, as distinct from the circuitry responsible for performing the control and/or regulation in power regulator 150. In FIG. 1b, the feedback control is shown as a Type 3 (or III) amplifier 134, but it may be any one of many possible feedback controllers. The purpose of the control loop may be to compare the output to a known reference, $V_R$, and adjust the PWM signal to correct for differences between the output and the reference. As pertaining to regulator 150 in FIG. 1b, and in general, the portion of the system without compensation may be considered the "plant". For example, the plant in regulator 150 may comprise HS FET 122, LS FET 124, inductor 126, the one or more capacitors 128, load 132, and PWM controller 120. In other words, all the components without the feedback control loop.

Any change that the control system makes, may introduce a disturbance to the system. A robust, practical system will remain stable in the presence of such disturbances. In fact, it is desirable to have a system that remains stable in the presence of a wide variety of possible disturbances, including input voltage changes, load changes, and even temperature changes, just to name a few. The stability of a system may be characterized in terms of how close the gain through the feedback path is to minus one (−1). That is, how close does the feedback, under the conditions of interest, approach a gain of −1. Because the feedback can have both a magnitude (gain) and phase relative to the output, the stability of the system may be expressed in terms of gain margin and phase margin, where the gain margin is a measure of how close the gain magnitude is relative to unity when the phase is 180 degrees, and the phase margin is a measure of how close the phase is relative to 180 degrees when the gain is unity. Both the phase margin and the gain margin may be determined from either a Nyquist diagram or Bode plot. Because the Bode plot has an easily readable frequency scale, it may provide an ideal feedback tool.

Without the feedback control loop, that is, without the Type 3 (III) amplifier 134, the simplified transfer function, or gain of the system illustrated in FIG. 1b may be given by the following equation:

$$G_P = G_{fix} \frac{1 + \frac{s}{\omega_{esr}}}{\frac{s^2}{\omega_n^2} + \frac{s}{Q\omega_n} + 1}, \quad (1)$$

where, $\omega_{esr}$ is the location of the zero due to the equivalent series resistance (ESR) of output capacitor 128, $\omega_n$ is the "natural" frequency of the output stage (comprising in this case inductor 126 and one or more capacitors 128), Q is the quality factor of the output stage, and $G_{fix}$ is the fixed modulation gain, as previously indicated. For the purposes of analysis, the contribution of the ESR of capacitor 128 may be assumed to be zero, obtaining the following transfer function:

$$G_S = G_{fix} \frac{1}{\frac{s^2}{\omega_n^2} + \frac{s}{Q\omega_n} + 1}. \quad (2)$$

Equation (2) contains two poles. For Q<0.5 (damped case), both poles are real. For Q>0.5 (underdamped case), the poles are complex conjugates. Q may be approximated to first order by the following relationship:

$$Q = \frac{V_{out}}{I_{out}\sqrt{\frac{L}{C}}} \quad (3)$$

where $V_{out}$ is the output voltage of regulator 150, $I_{out}$ is the load current, L is the inductance of inductor 126, and C is the capacitance of capacitor 128. For a value of 1V for the output $V_{out}$, an inductance of 1 µH of inductor 126, a capacitance of 100 µF for capacitor 128, a quality factor Q of 10 may correspond to 1 A output current, a Q of 1 may correspond to a 10 A output current, and a Q of 0.4 may correspond to an output current of 25 A.

Figure 2:
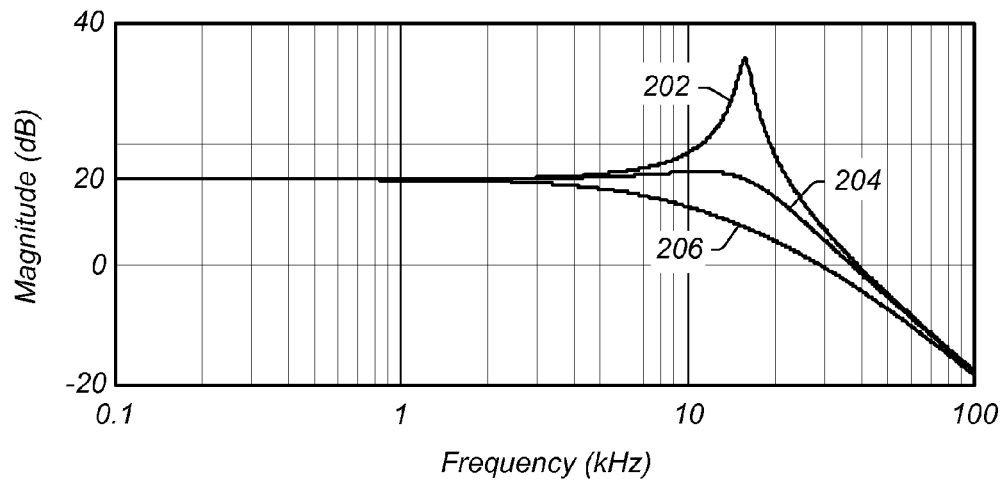
FIG. 2 shows a magnitude portion of a Bode plot for one embodiment a simplified switching power converter (plant)
Figure 3:
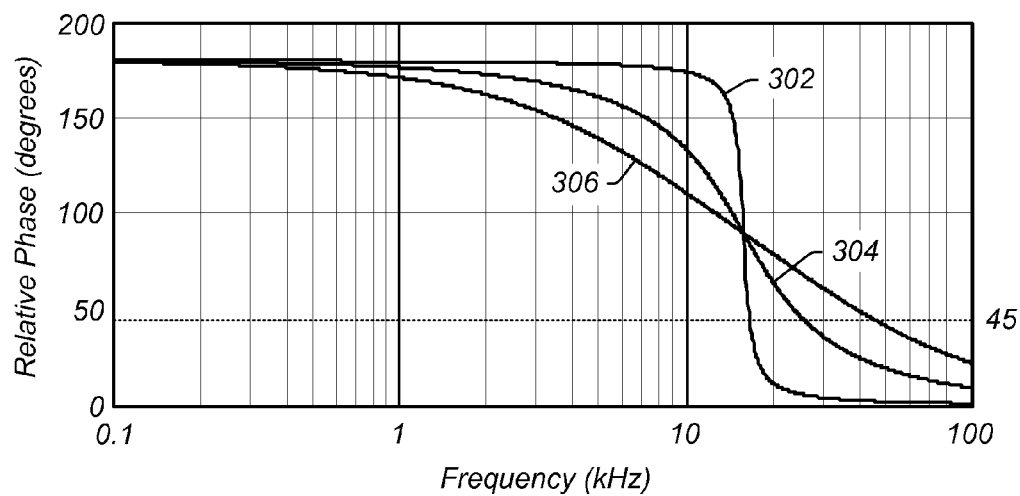
FIG. 3 shows a phase portion of a Bode plot for one embodiment a simplified switching power converter (plant)

FIG. 2 and FIG. 3 show the Bode plot of this equation for the magnitude and relative phase, respectively, with $G_{fix}$ equal to 5 and $\omega_n$ equal to 16000 Hz. Curves 202 and 302 correspond to Q having a value of 10, curves 204 and 304 correspond to Q having a value of 1, and curves 206 and 306 correspond to Q having a value of 0.4. In FIG. 3, the phase is shown relative to 180 degrees in order that the phase margin may be read directly by the observing the phase curve's value at the frequency where the gain is unity. A typical minimum acceptable phase margin may be 45 degrees, as indicated by the dotted line on the phase graph in FIG. 3.

Figure 4:
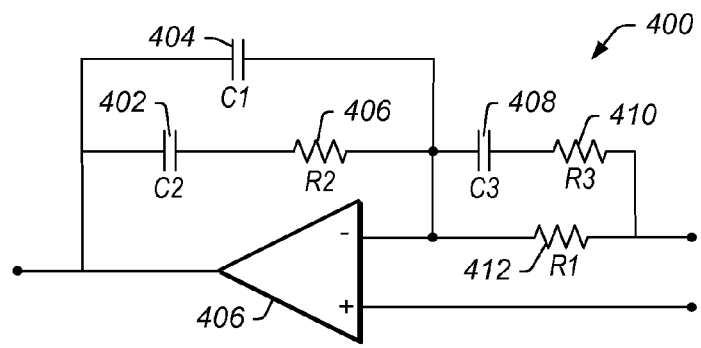
FIG. 4 shows one embodiment of a Type III compensation network.

The unity gain crossover frequency for all three cases (i.e. all three examples of the value of Q) may range from approximately 30 kHz to 40 kHz. As can be readily seen, the phase margin for the cases when the value of Q is high (Q>0.5, underdamped) is below the limit of 45 degrees. Because of the marginal or even unacceptable phase margins for this plant, compensation may be required to adjust the system response to a (more) stable condition. Compensation may be implemented by configuring a network in the feedback path that adds appropriate poles and zeros to ensure stable operation of the system. A typical analog circuit 400 for such a network is illustrated in FIG. 4. FIG. 4 shows a type III compensation network 400, which may also be recognized as a PID filter. The poles and zeros of circuit 400 may be determined by the combination of resistors 406, 410, and 412, and capacitors 402, 404, and 408 coupled to amplifier 406, which may be a type III amplifier, as previously mentioned. In one sense, compensation may operate to adjust the poles and zeros to "compensate for" the poles and zeros of the plant. Thus, compensators may be designed in terms of poles, zeros, gain, and frequency.

Compensation network 400 may provide two real zeros, and three poles (including the pole at zero) to the system response. The zeros may be used to compensate for the two poles from the output power stage (inductor 126 and capacitor 128). One pole may be used to compensate for the ESR value of capacitor 128, and a second pole may be used to ensure low gain for high frequencies. Compensation network 400 may be limited in that it provides real zeros to compensate for the poles of the output stage (inductor 126 and capacitor 128). As previously noted, the poles of the output stage may be real only when the value of Q is low. For Q>0.5, the poles are complex, and as the value of Q increases, real zeros become increasingly inadequate in compensating for the complex poles.

Figure 5:
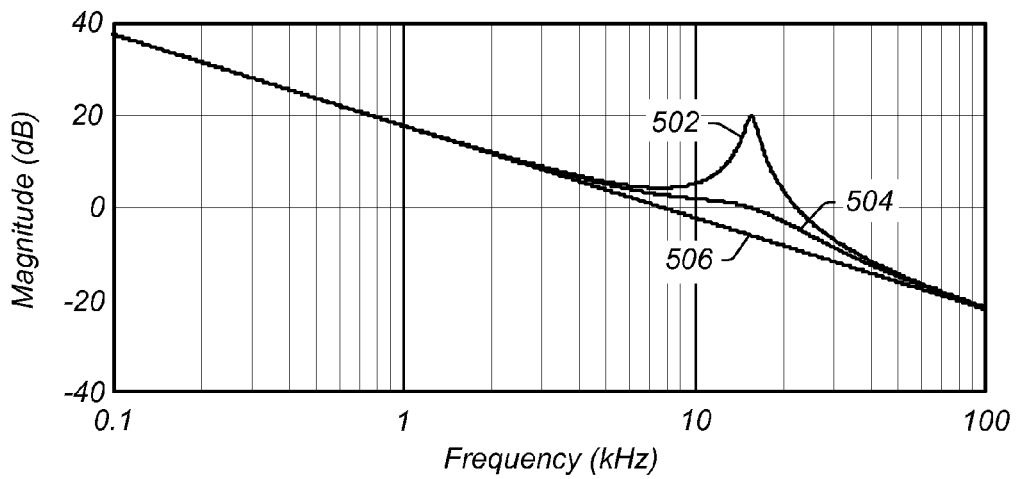
FIG. 5 shows a magnitude portion of a Bode plot for one embodiment of a Type III compensated power converter.
Figure 6:
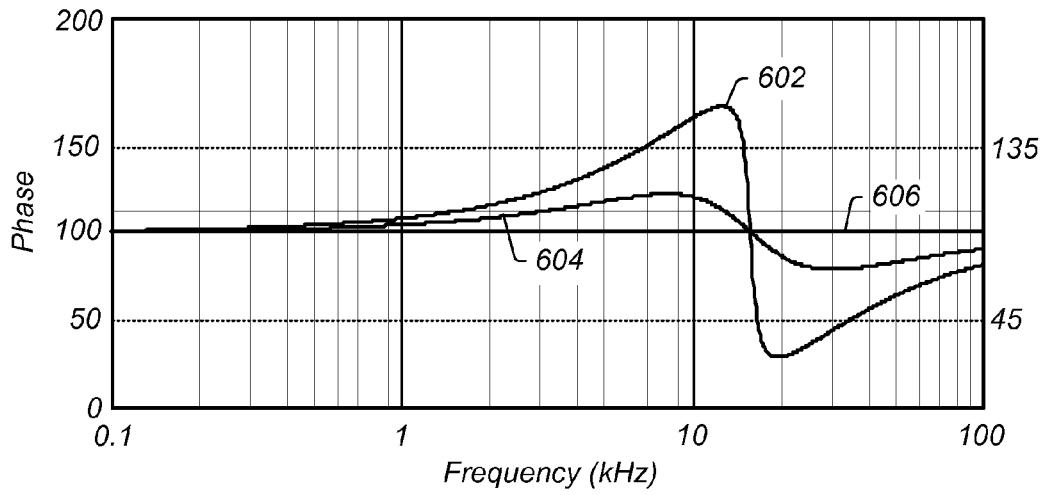
FIG. 6 shows a phase portion of a Bode plot for one embodiment of a Type III compensated power converter.
Figure 7:
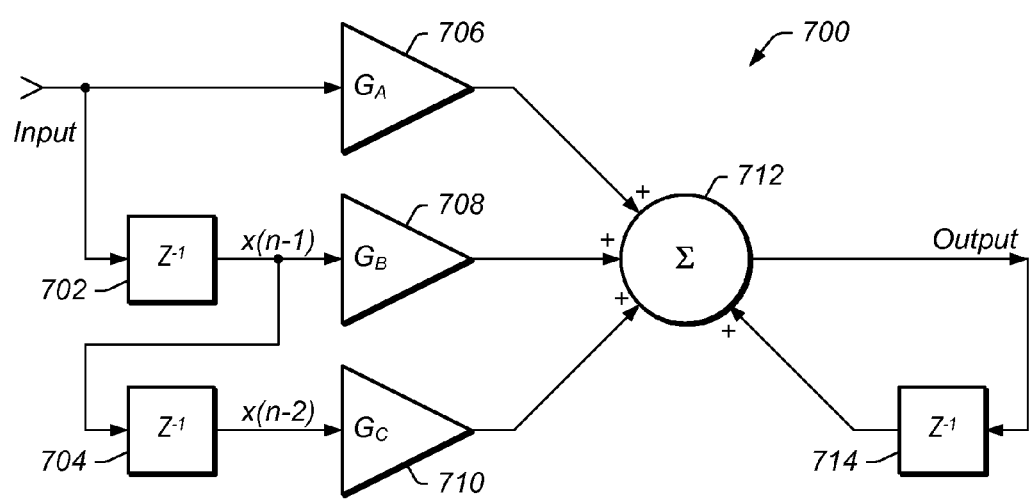
FIG. 7 shows one embodiment of a digital PID compensation network.

In general, it may be best to place the real zeros of the compensator at the pole locations of the output stage. FIG. 5 and FIG. 6 show the magnitude and phase Bode plots, respectively, for a Type III compensation network, with real zeros placed according to the location of the poles of the output stage. Curves 502 and 602 correspond to Q having a value of 10, curves 504 and 604 correspond to Q having a value of 1, and curves 506 and 606 correspond to Q having a value of 0.4. As can be seen, the real zeros are ideal for compensating the output stage for the value of Q corresponding to real poles. The Type III compensator may be adequate for moderate values of Q, but may be inadequate for high values of Q. This has resulted in many designs implementing a more complicated "current controlled" control, which typically requires the introduction of an additional feedback loop to eliminate one of the poles from output stage. The actual challenge to overcome is the compensation network not providing the right type of zeros for compensating the output stage. While Type III compensator may be adequate for low values of Q, they are inadequate when Q has higher values.

Digital control may provide means for designing a variety of compensators, from the simple to the sophisticated. One embodiment of a simple digital PID filter 700 is shown in FIG. 6. Digital filter 700 may take the error signal, sum (712) the scaled signal (through scaler 706) with scaled delayed samples of the error signal (through 702 and 708, and 704 and 710, respectively), plus the integrated output (through 714) to implement the compensator. Three gain coefficients may therefore be used to tune the compensator. A transfer function of filter 700 may be described by the following equation:

$$G_d = \frac{A + Be^{-sT} + Ce^{-2sT}}{e^{-sT}(1 - e^{-sT})}, \quad (4)$$

or, in terms of the z-transform:

$$G_d = \frac{A + Bz^{-1} + Cz^{-2}}{(1 + z^{-1})}, \quad (5)$$

where A, B, and C are the gain coefficients for the various taps. The first term in the denominator corresponds to the delays in the signal path, the second term in the denominator corresponds to the accumulator at the output of the summing stage, and T is the switching frequency of the voltage regulator, e.g. the switching frequency of PWM controller 120. Overall, coefficients A, B, and C may define the response of the compensator, and may relate to the proportional, integral, and derivative error, which may combined to form compensator 700.

Compensator 700 can be seen to have two zeros, a pole at zero, and a pole at infinity. The two zeros may be available to compensate for the two poles in the output stage (e.g. inductor 126 and capacitor 128) of the plant. These zeros arise as solutions to the quadratic equation in the numerator of equations (4) and (5). Accordingly, depending on the values of A, B, and C, there may be two real zeros or a pair of complex conjugate zeros. Digital PID compensator 700 may therefore provide not only the same real zeros as a Type III analog compensator, but also complex zeros, which may be more suitable for compensating complex poles. In other words, A, B, and C may be defined/specified such that the zeros of the plant are compensated. However, it may not be intuitive how A, B, and C relate to the gain ($G_p$), Q, and the frequency ($\omega_n$). It should be noted, that while A, B, and C are shown here to relate to the gain ($G_p$), Q, and the frequency ($\omega_n$), A, B, and C, or other possible coefficients of the digital compensator, may equally be related to other characteristics of the plant, e.g. dissipation, attenuation, characteristic times, etc. However, using zero-pole matching, A, B, and C may be combined into a Gain term Gc, a Q term Qc, and a Frequency term fc (or $\omega c$), to facilitate matching the zeros to the corresponding poles of the output stage. Similar to the parameters of the plant characteristics, Gc may correspond to the gain of the compensator, Qc may correspond to the Q of the compensator, and fc ($\omega c$) may correspond to the characteristic frequency of the compensator.

One possible mapping of the parameters is shown below:

$$Qc := \sqrt{\frac{1}{4} - \left(\frac{\ln\left(\frac{\frac{-B}{\sqrt{AC}} + \sqrt{\frac{B^2}{AC} - 4}}{2}\right)}{\ln\left(\frac{A}{C}\right)}\right)^2} \quad (6)$$

$$fc := \frac{fs * Qc * \ln\left(\frac{A}{C}\right)}{2\pi} \quad (7)$$

$$Gc := A + B + C. \quad (8)$$

Other mappings may be possible and are contemplated, and the above mappings are provide as examples for at least one set of embodiments.

Figure 16:
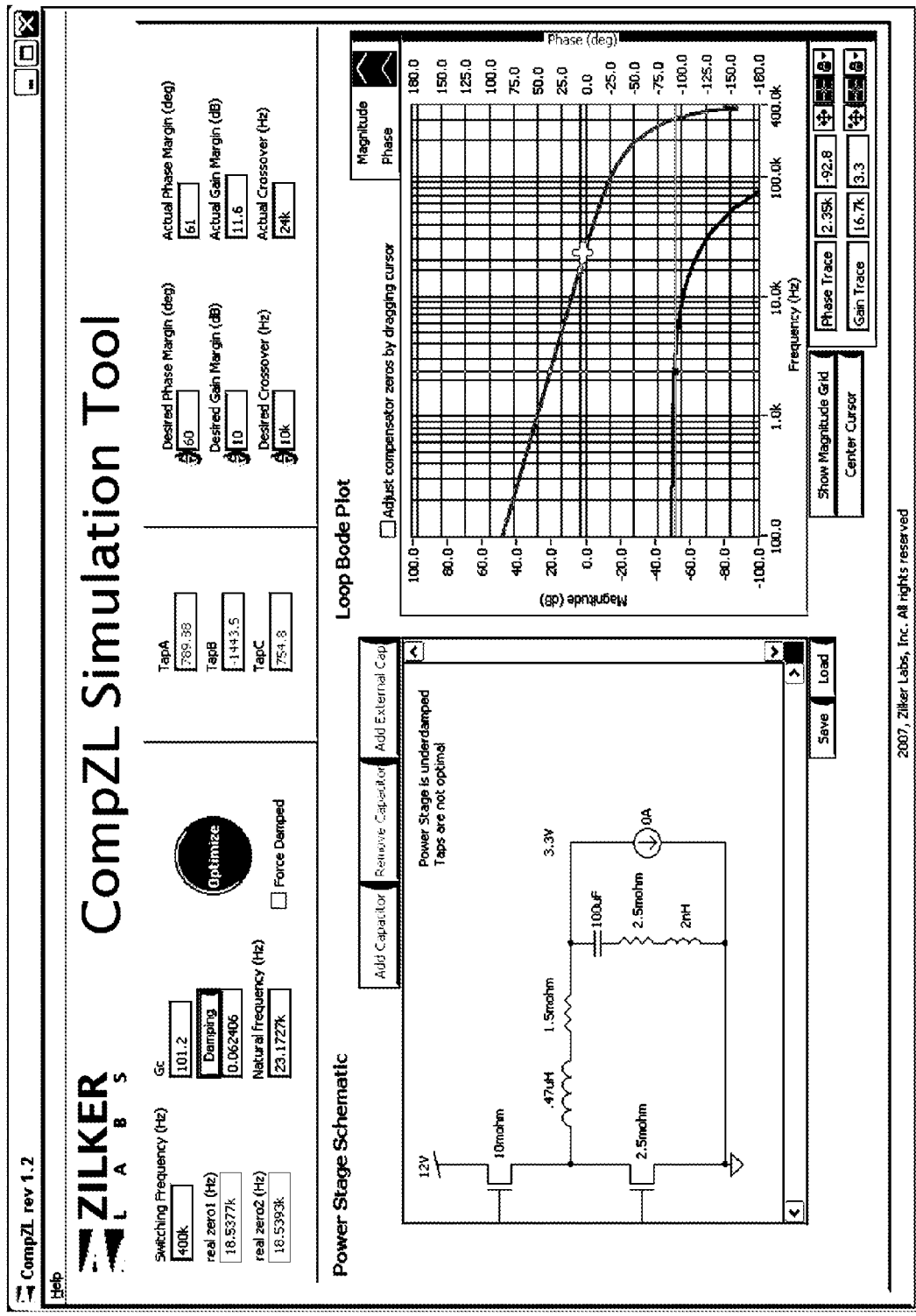
FIG. 16 shows one embodiment of a user interface console of an interactive computer program to characterize a digital PID compensator.

In one set of embodiments, a simulation program and graphical user interface may be provided to facilitate programming/entering compensator characteristic based on plant characteristics, which may also be programmed/entered through the user interface. One example of the graphical user interface is shown in FIG. 16. The approach described above is illustrated in FIGS. 17-20, by providing examples of how plant characteristics may be entered into the simulation program, and compensator characteristics may be obtained by executing one or more algorithms implemented in the simulation program.

Figure 17:
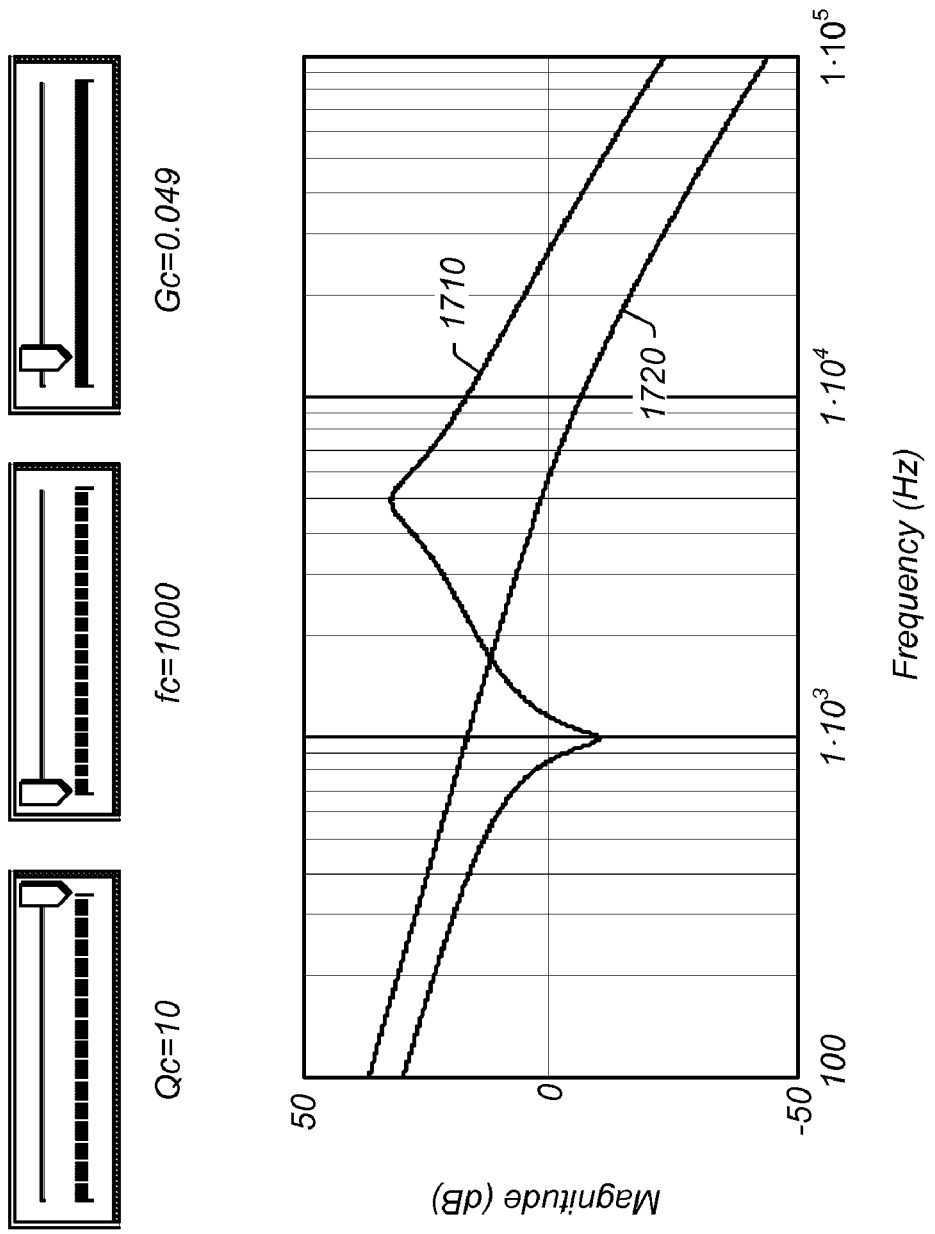
FIG. 17 shows a first step in adjusting a characteristic of one embodiment of a digital PID compensator using the interactive computer program referenced in FIG. 16.
Figure 18:
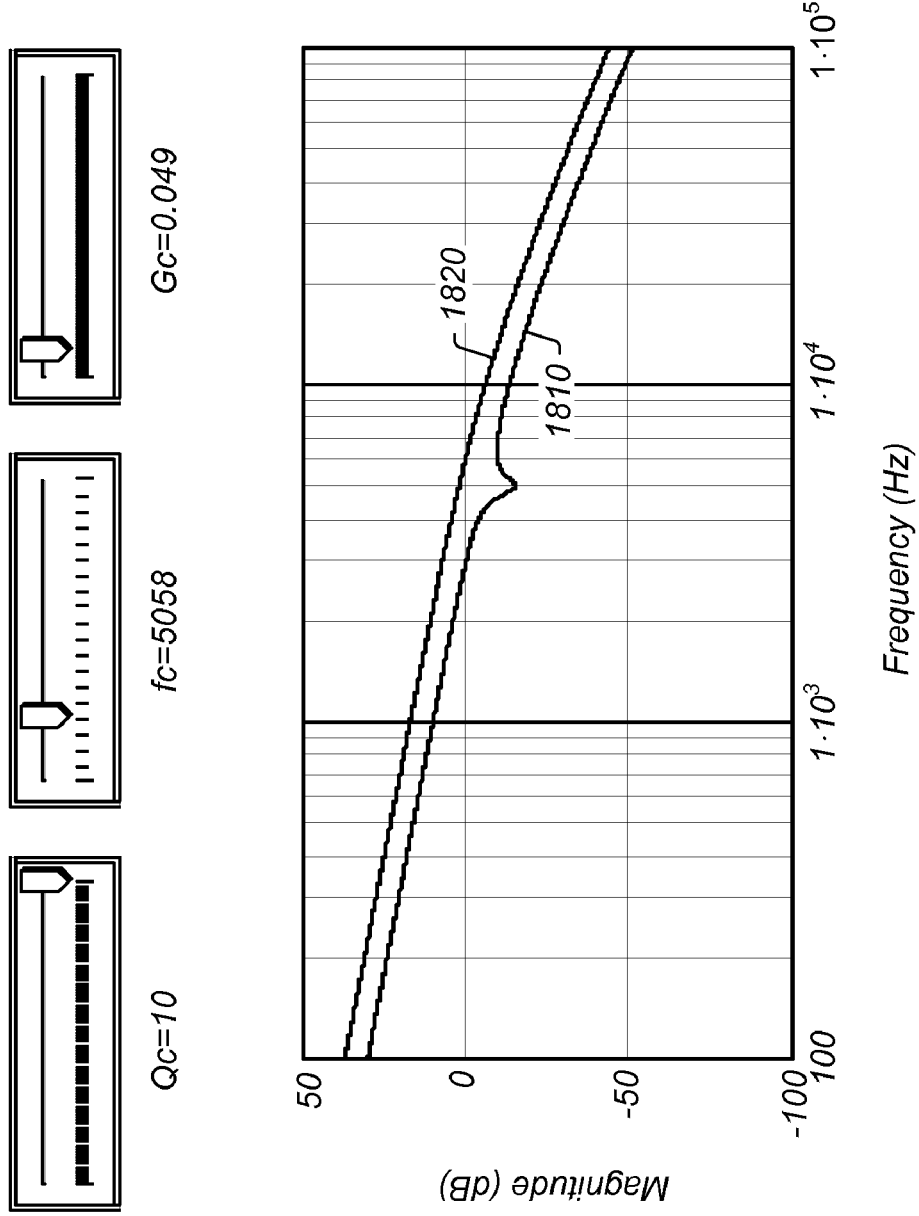
FIG. 18 shows a second step in adjusting a characteristic of one embodiment of a digital PID compensator using the interactive computer program referenced in FIG. 16.
Figure 19:
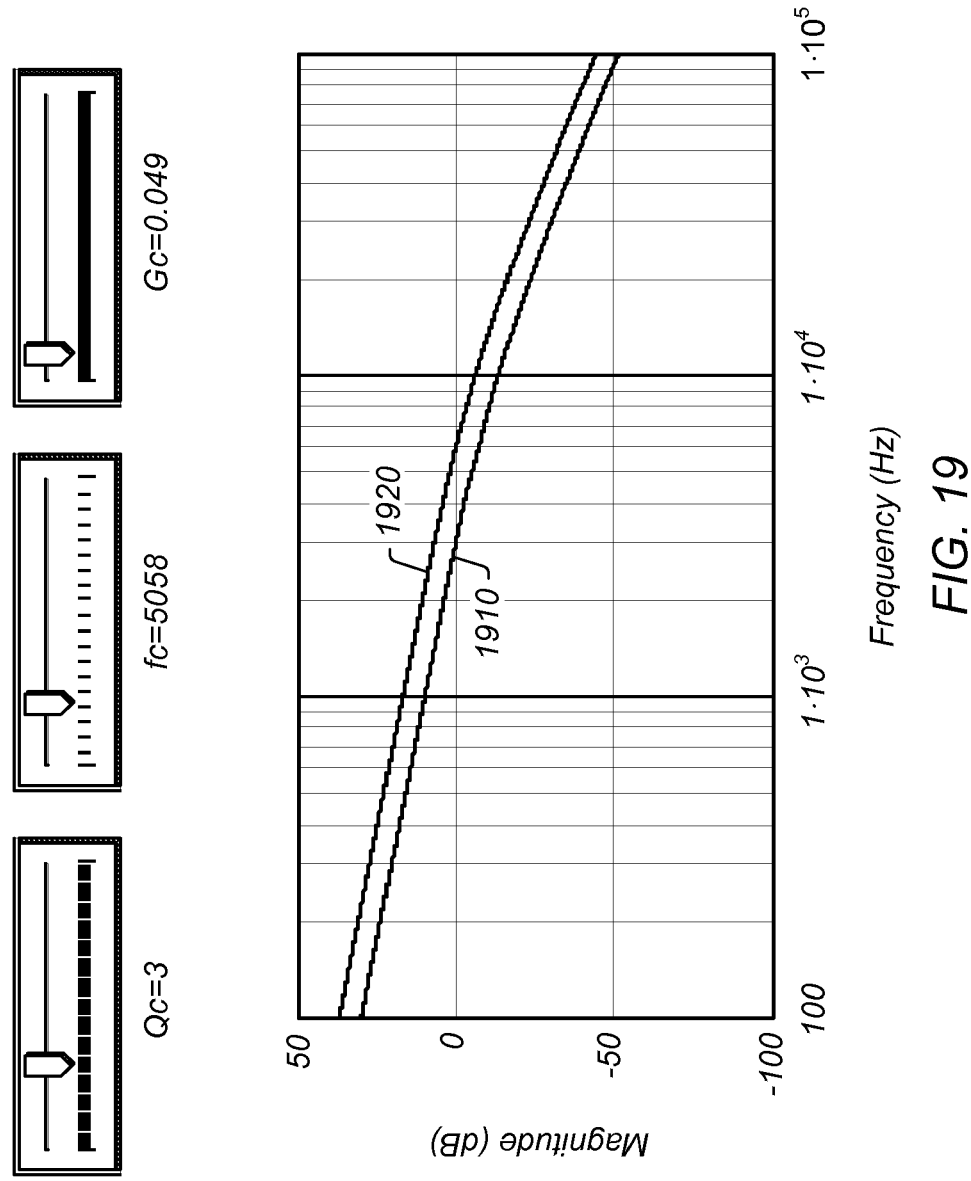
FIG. 19 shows a third step in adjusting a characteristic of one embodiment of a digital PID compensator using the interactive computer program referenced in FIG. 16.
Figure 20:
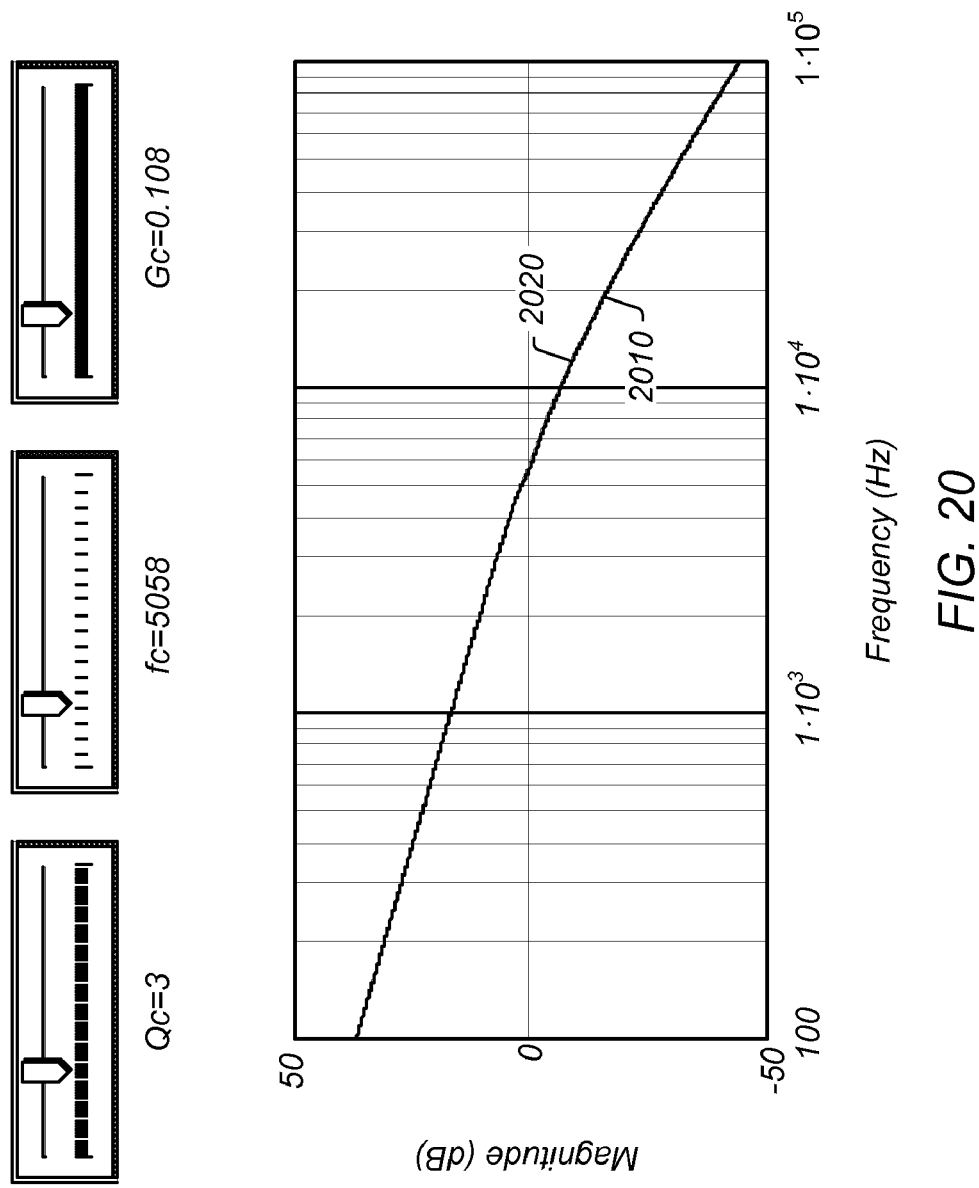
FIG. 20 shows a final step in adjusting a characteristic of one embodiment of a digital PID compensator using the interactive computer program referenced in FIG. 16.

In the example shown in FIG. 17, Q may be set to 3, and $\omega_n$ may be set to 5 KHz. A compensator may be initially configured to provide less than ideal compensation, by setting Qc to 10, $\omega_c$ to 1 KHz, and Gc to 0.049. The compensator frequency may then need to be moved to the plant frequency. However, it may not be intuitive how A, B, and C may need to be changed to move the compensator frequency. It may apparent from function curves 1710 and 1720, which represent the present response and desired response, respectively, that the compensator frequency may be too low, and Qc may be too high. Thus, the frequency may be increased to around 5 KHz, resulting in the responses shown in FIG. 18, where function curves 1810 and 1820 represent the present response and desired response, respectively. Since there is a "dip" in function curve 1810, Qc may be reduced to 3, resulting in the responses shown in FIG. 19, where function curves 1910 and 1920 represent the present response and desired response, respectively. As seen in FIG. 19, the shape of the actual response is now almost identical to that of the desired response, but exhibiting lower amplitude. Thus, the gain Gc may be boosted to 0.108, leading to the result shown in FIG. 20. As seen in FIG. 20, function curves 2010 and 2020 match almost perfectly, indicating a properly compensated system.

In one set of embodiments, plant characteristic frequency may be determined by observation, and plant Q may be determined according to one of a variety of methods and techniques currently available. Those skilled in the art will appreciate all such techniques and methods, and how those techniques may be used to determine the value of Q for a given plant. Overall, once the plant characteristics have been determined, the compensator frequency and Q may be adjusted to match the corresponding (equivalent) characteristics of the plant, and the compensator gain may be adjusted to achieve the desired phase margin, gain margin, and/or cross-over frequency. In one set of embodiments the adjustments may be made using a program and graphical user interface as described above in reference to FIGS. 16-20.

Figure 8:
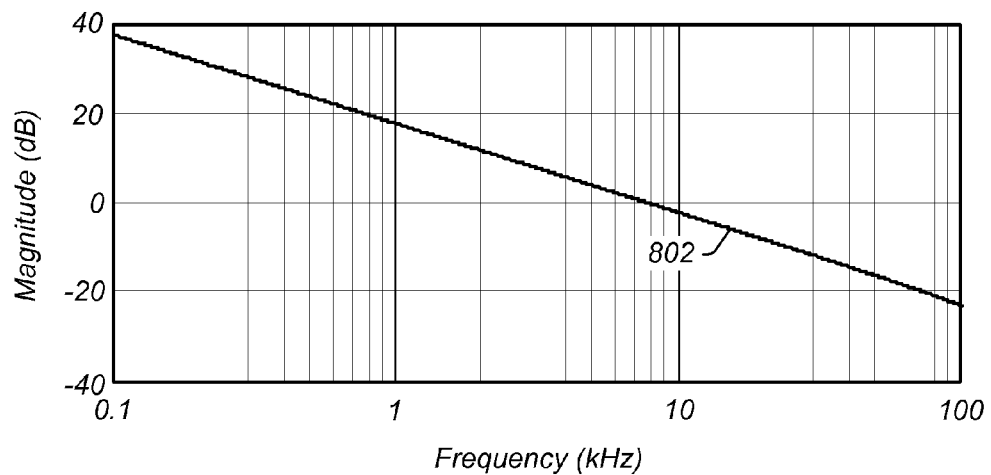
FIG. 8 shows a magnitude portion of a Bode plot for one embodiment of a simplified power converter compensated with a matched digital PID compensator.
Figure 9:
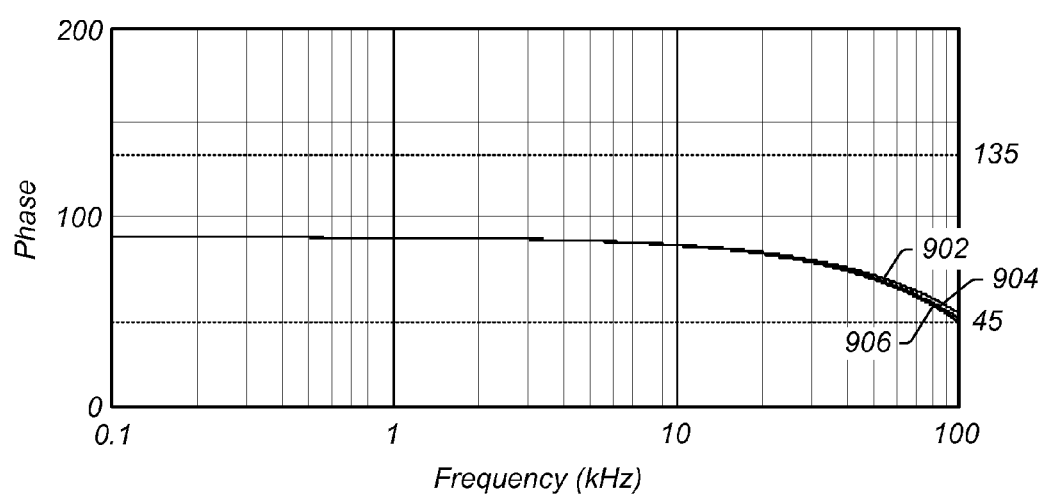
FIG. 9 shows a phase portion of a Bode plot for one embodiment of a simplified power converter compensated with a matched digital PID compensator.

Using an approach such as described above, the plant (for power converter 150, for example) may be compensated using a PID compensator. FIGS. 8 and 9 show the Bode plots for simplified power converter 150 compensated with a matched digital PID compensator, for the cases shown in FIGS. 2 and 3 (magnitude and phase, respectively) for values of 10, 1, and 0.4 of Q. As indicated by function curve 802 (magnitude) and function curves 902, 904 and 906 (phase), the compensation is nearly perfect for all three cases. Although the responses shown in FIGS. 8 and 9 indicate nearly perfect results due to the PID compensator being matched to each respective value of Q for each case—that is, being matched to each condition of Q—these results may not reflect practical applications where a single compensated system may experience a range of different values of Q, and, without auto-tuning, may need to be compensated to match a single Q value.

Figure 10:
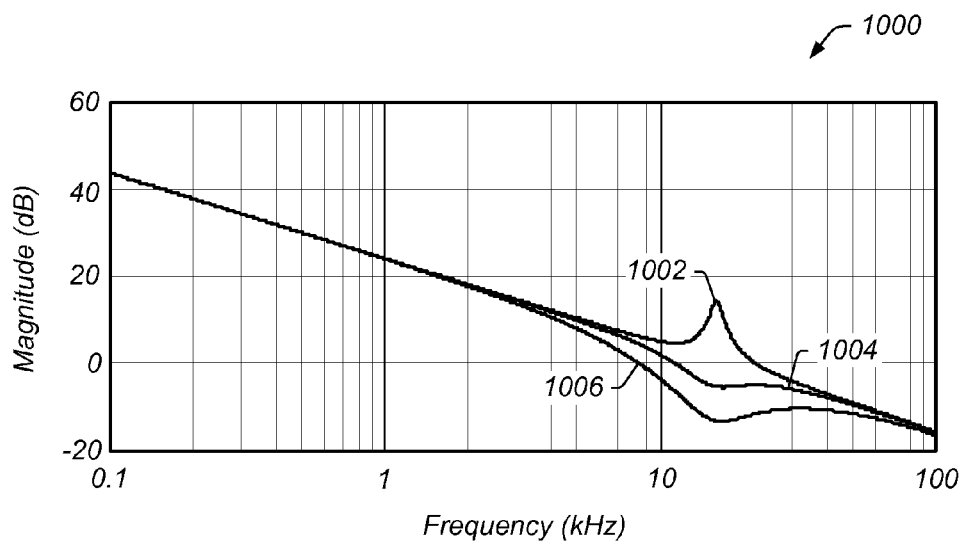
FIG. 10 shows a magnitude portion of a Bode plot for one embodiment of a simplified power converter compensated with a fixed digital PID compensator.
Figure 11:
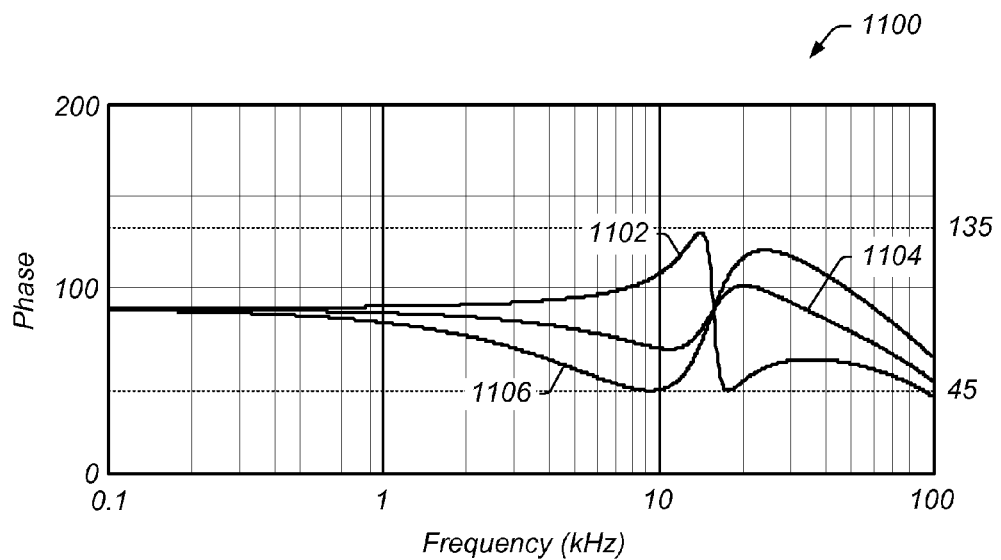
FIG. 11 shows a phase portion of a Bode plot for one embodiment of a simplified power converter compensated with a fixed digital PID compensator.
Figure 21:
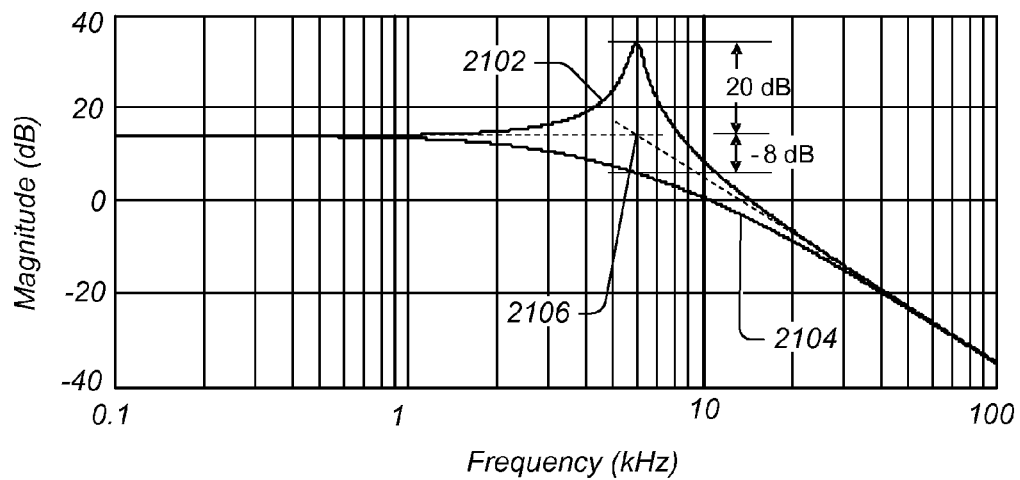
FIG. 21 shows a Bode plot of one embodiment of a plant response showing resonant and damped characteristics'

The performance of a digital PID compensator set for a single Qc value (in this case Qc=2), and applied to simplified power converter 150 is shown in FIGS. 10 and 11. The gain has been adjusted to provide roughly the same crossover frequency as the Type III example shown in FIGS. 5 and 6. FIGS. 10 and 11 show the Bode plots (magnitude and phase, respectively) for simplified power converter 150 being compensated with a fixed digital PID compensator. That is, the PID compensator may not be matched to any of the specific Q values (in this case 10, 1, and 0.4), but may be set, as indicated above, for a Q value of 2. Function curves 1002, 1004, and 1006 represent the compensated magnitude responses corresponding to values of 10, 1, and 0.4 of Q, respectively. Function curves 1102, 1104, and 1106 represent the corresponding compensated phase responses corresponding to values of 10, 1, and 0.4 of Q, respectively. It is apparent when contrasting FIGS. 5 and 6 with FIGS. 10 and 11, that even in the best case, a Type III compensator was not capable to provide adequate compensation for the range of Q values (10, 1, 0.4) even if different compensation values were allowed for each value of Q. On the other hand, even when constrained to a single set of compensation values, the digital PID compensator may be able to provide adequate compensation over the entire range of values of Q.

As previously mentioned, plant characteristic frequency may be determined by observation, and plant Q may be determined according to one of a variety of methods and techniques currently available. In one set of embodiments, the plant may be observed and characterized using a network analyzer to generate the Bode plot for the plant (for simplified power converter 150, for example), similar to the Bode plots shown in FIGS. 2 and 3 (for magnitude and relative phase, respectively). In systems having high values of Q, the resonant peak in the plant may be readily identified. The characteristic frequency may be determined by observing where the peak of the resonance occurs along the frequency axis. The value of Q may be determined from the height or depression of the resonant (anti-resonant) point as illustrated in FIG. 20. The value of Q (in dB) may be obtained directly from the Bode plot relative to the intersection 2106 of the low frequency and high frequency asymptotes between function curve 2102 representing the present response and function curve 2104 representing the desired response, as shown. In the cases illustrated in the figure, a Q of 10 appears as a 20 dB peak and a Q of 0.4 appears as a depression of −8 dB.

Figure 12:
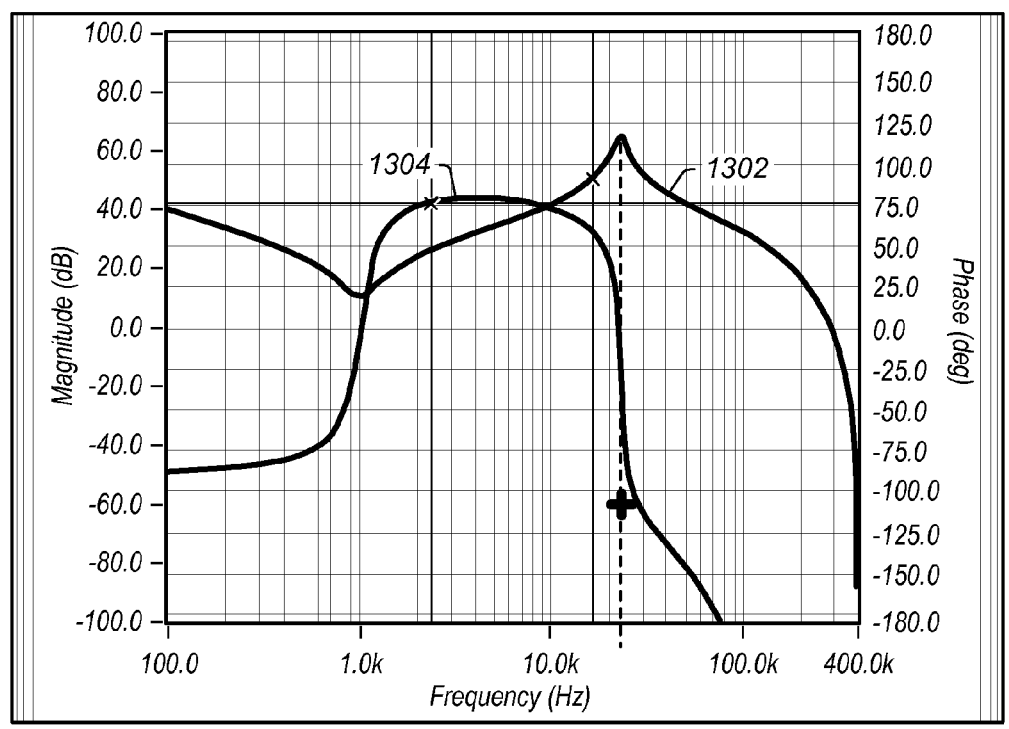
FIG. 12 shows a Bode Plot for one embodiment of a mismatched compensator showing plant resonance and compensator anti-resonance.
Figure 13:
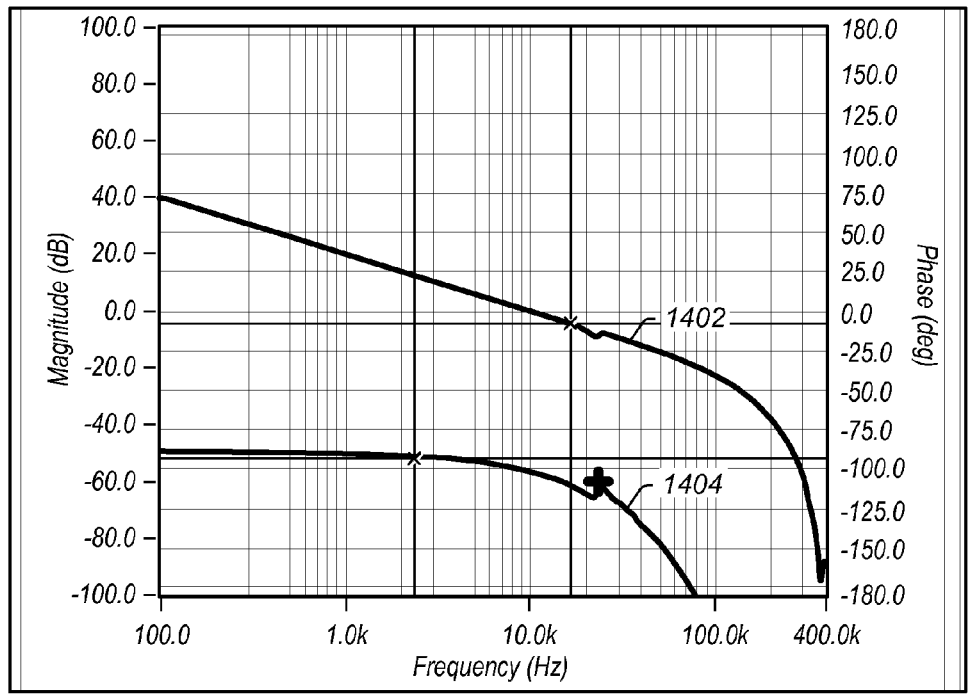
FIG. 13 shows a Bode Plot for one embodiment of a compensator with frequency matched to a resonant point of the plant.
Figure 14:
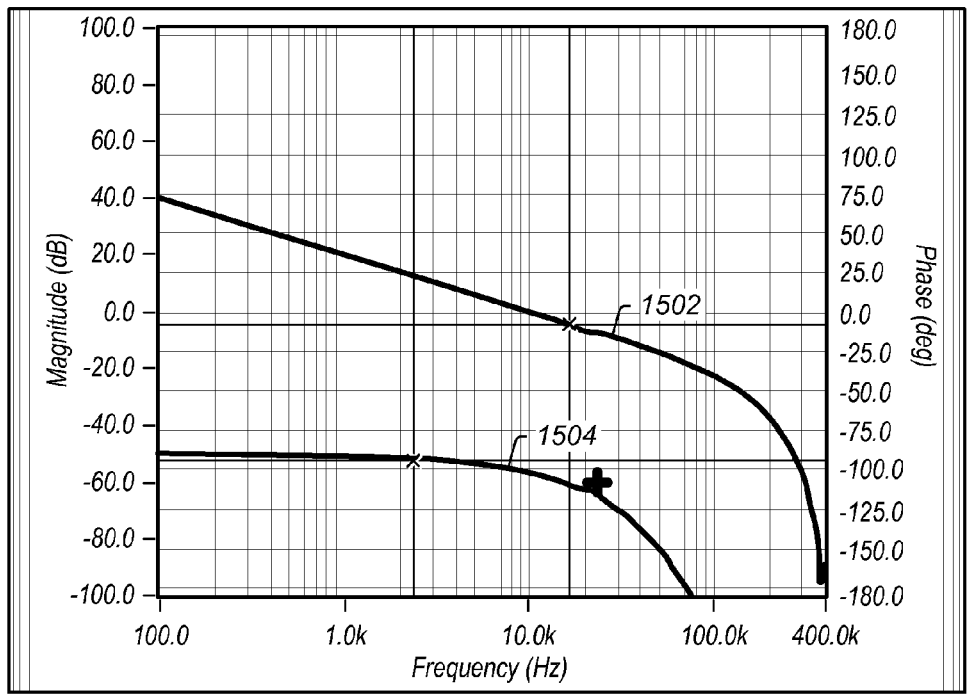
FIG. 14 shows a Bode Plot for one embodiment of a matched compensator.

FIGS. 12-14 show another example of how compensation may be obtained through obtaining plant characteristics and adjusting compensator characteristics. FIG. 12 shows a Bode Plot for a mismatched compensator showing plant resonance and compensator anti-resonance via function curves 1302 and 1304. For the example shown in FIG. 12, the value of Q for the plant is 8 and the resonant frequency for the plant is 23.17 kHz. FIG. 12 shows what may be observed on a network analyzer if the compensator were not matched to the plant. In this case the value of Qc for the compensator has been set to 3, and the resonant frequency fc has been set to 1 kHz. The first step in the process may be to identify the plant characteristic frequency and Q. The peak of function curve 1302 may be seen to be at around 23 kHz (as mentioned above). The height of the peak is shown as approximately 20 dB. The next step may include the repositioning of the compensator frequency and Q to align with the plant. A resonant peak of 20 dB may be shown to be equivalent to a Qc value of 10. Thus, Qc may be changed from 3 to 10.

The result of this change may be observed in FIG. 13, which shows a Bode plot for a compensator with frequency matched to a resonant point of the plant. Although the phase margin (77 degrees) and gain margin (19 dB) may indicate more than adequate compensation, it does appear, from the dip in the magnitude line of the Bode plot at 23 kHz, that the value of Qc for the compensator may be too high (corresponding to anti-resonance in this case). A methodical reduction in the magnitude of Qc for the compensator may result in a Qc value of 8, leading to the final Bode plot illustrated in FIG. 14, which shows the Bode plot (function curves 1502 and 1504) for a matched compensator. These results indicate a near perfect solution for the compensation. It may also be interesting to consider the original, starting values for the coefficients A, B, and C, and compare those value to the final values of these coefficients. The original values of A, B, and C were, respectively 166606, −332300, and 165736. The final values turn out to be, respectively, 325, −594, 310. It is therefore difficult to intuitively perceive how such changes in these coefficients would result in the effected changes.

In one set of embodiments, the principles described above may also be used to implement adaptive compensation. For any given design (plant), the load may be the variable of most concern. For example, regarding regulator 150 (or 100), inductor 126 and capacitor 128 may usually be fixed. Changes in the input voltage $V_{in}$ may be addressed and compensated for using feedforward gain adjustment. $V_{out}$ may be regulated to a fixed value, although it may briefly change during ramp up and/or ramp down. Therefore, $I_{out}$, (i.e. the load current) may remain as one of the main parameters that may have a noticeable effect on the value of Q. Thus, the impact of the change in $I_{out}$ may be observed with respect to gain, frequency, and Q. A result of this observation indicates that the optimal gain and frequency may change very little, while the optimal value of Q may change inversely with respect to the load current. Based on the plant characteristics, which may be determined at least according to the methods previously described, a relationship between the value of Q and $I_{out}$ may be established for each plant, and Qc may be dynamically, inversely adjusted with respect to $I_{out}$. Thus, compensation may also adaptively be adjusted when there is a change in the plant characteristic, through monitoring the load current and adjusting the value of Q according to the change in the load current. In other embodiments, operating features other than the load current may be monitored to adjust the value of Q, or to possibly adjust one or more of the other characteristics.

In one set of embodiments, certain optimization features may be implemented through a variety of algorithms, which may be used for example with the program and graphical user interface mentioned with respect to FIGS. 16-20. According to one algorithm, given a power filter, P(s), the optimizer may be configured to find a compensation filter, Copt(s), such that Copt(s)*P(s) has the lowest deviation in gain or phase, with respect to frequency, among all values of C(s)*P(s). The optimization feature may determine the optimum compensation filter Copt(s) in an iterative fashion, by varying filter parameters and measuring the standard deviation of the derivative of phase (or gain) with respect to frequency. The optimizer may perform successive adjustments of the filter parameters and corresponding measurements of the standard deviation of the derivative of phase (or gain) with respect to frequency, and may compare the present results with the most recent previous results. The result of this comparison may determine a set of filter parameters to use for the next trial. The series of adjustments and measurements may be halted when the filter parameter adjustments, at a given, specified resolution, no longer result in a reduction of phase or gain deviation. The optimizer may repeat the series of adjustments and measurements, using finer filter parameter adjustments. The resolution of the next series of adjustments and corresponding measurements may be determined by the resolution of the previous series.

In one set of embodiments, a general optimizer algorithm may be configured to find a filter $T^{opt}(s)$, among a set of filters, $T_{X,Y}(s)$, with a lowest deviation in gain or phase, with respect to frequency, where X and Y are two independent variables of size (1×N) and (1×M). Together, $x_i$ and $y_j$ may define each member filter, $T_{xi,xj}(s)$. The filter characteristic, $e_{xi,yj}$, may be defined as the standard deviation of the first derivative of either $|T_{xi,xj}(s)|$ or $\text{angle}(T_{xi,xj}(s))$. The optimizer may perform successive "trials" in which $e_n$ (result of a present trial) may be compared to $e_{n-1}$ (result of a most recent previous trial.) The result of this comparison may determine the values that may be used in the next trial, namely, $x_{n+1}, y_{n+1}$, which may define $T_{xn+1,yn+1}$, with characteristic $e_{n+1}$. The optimizer may stop upon reaching the minimum $e_{xi,yj}$, which may be referred to as $e_{min}$, with $x_i$ equal to $x_{min}$ and $y_i$ equal to $y_{min}$. The optimal filter, $T^{opt}(s)$, may then be identified as $T_{xmin,ymin}(s)$. One embodiment 1200 of the general optimizer algorithm is shown in FIG. 15.

Figure 15:
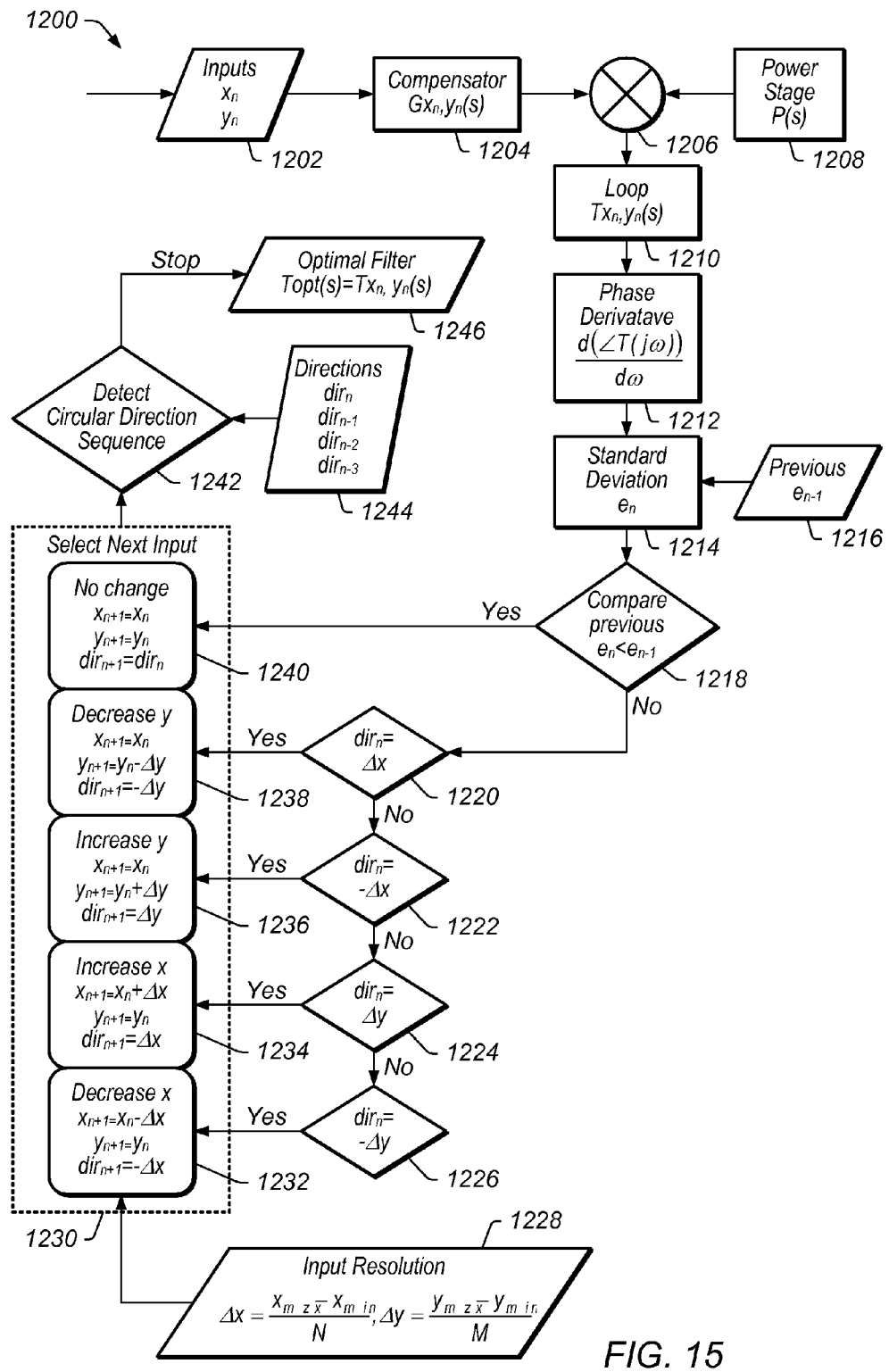
FIG. 15 shows one embodiment of a general optimizer algorithm to obtain characteristics of a compensator.

As shown in FIG. 15, two independent variables x and y may be provided as inputs to the algorithm (1202), and may be used to construct a compensator (1204), which may be correlated with a power stage, or power filter (1208). The iterative loop may be entered at (1210), and the filter characteristics may be defined in (1212) and (1214), with a previous standard deviation (1216) taken into account when performing (1214). The present and previous values of $e_n$ may be compared (1218), and if the present value is less than the most recent previous value of $e_n$, the direction of change in x and y for the next trial may remain constant. (1240). Otherwise, the values of x and y may be adjusted depending on the direction of change in the values of x and y from their most recent previous values (1220, 1222, 1224, 1226, 1238, 1236, 1234, and 1232). The input resolution may be specified in (1228). Directions may be determined in (1244), and upon detecting the circular direction sequence, the iterations may be halted and the filter $T^{opt}(s)$ may be set according to the current values of x and y (1246).

The above algorithms are provided as examples that may be executed to perform compensation. Other algorithms based on the principles described herein are possible and are contemplated, and may be configured based on established goals for various plants and, in general, power regulators.

In summary, Type III compensation typically lacks complex zeros that may be needed to adequately compensate complex poles in output stages having a high value of Q. While complex zeros may be added to Type III compensators, they may represent a cost and space disadvantage. Digital PID compensators allow both real zeros and complex conjugate zeros, which may provide ideal compensation of output stages over a wide range of values of Q. In many embodiments, a single set of digital PID compensation coefficients may be adequate to compensate a wide (25:1) range of Q values of the output stage. Transformation of the PID coefficients (A, B, and C) from their intrinsic values representing proportions of error, integral, and differential contributions, to values representing gain, Q, and frequency, make the job of observational based compensation more practical and thus more satisfying and useful. While embodiments of the compensated systems disclosed herein are directed towards POL regulators, those skilled in the art will appreciate that the principles set for herein may equally be applied to other systems that may use digital compensation, e.g. motion control systems, amplifiers, process control systems, flight control systems, etc. Furthermore, a digital compensator may have a different number of coefficients than the embodiments presented herein, and these coefficients may be related to characteristics of the plant that may be well known to one skilled in the art, though not expressly presented herein as part of any of the embodiments. Examples of such characteristics may include dampening, fluid velocity, range of motion, etc.

It should be noted that one or more power control systems may be configured with POL regulators operating according to the principles described above, with the POL regulators communicating with each other over a common bus, which may be a serial bus, as set forth, for example, in U.S. Publication No. 20040201279 and U.S. patent application Ser. No. 11/198,698, which were previously indicated as being incorporated by reference as though fully and completely set forth herein.

Figure 22:
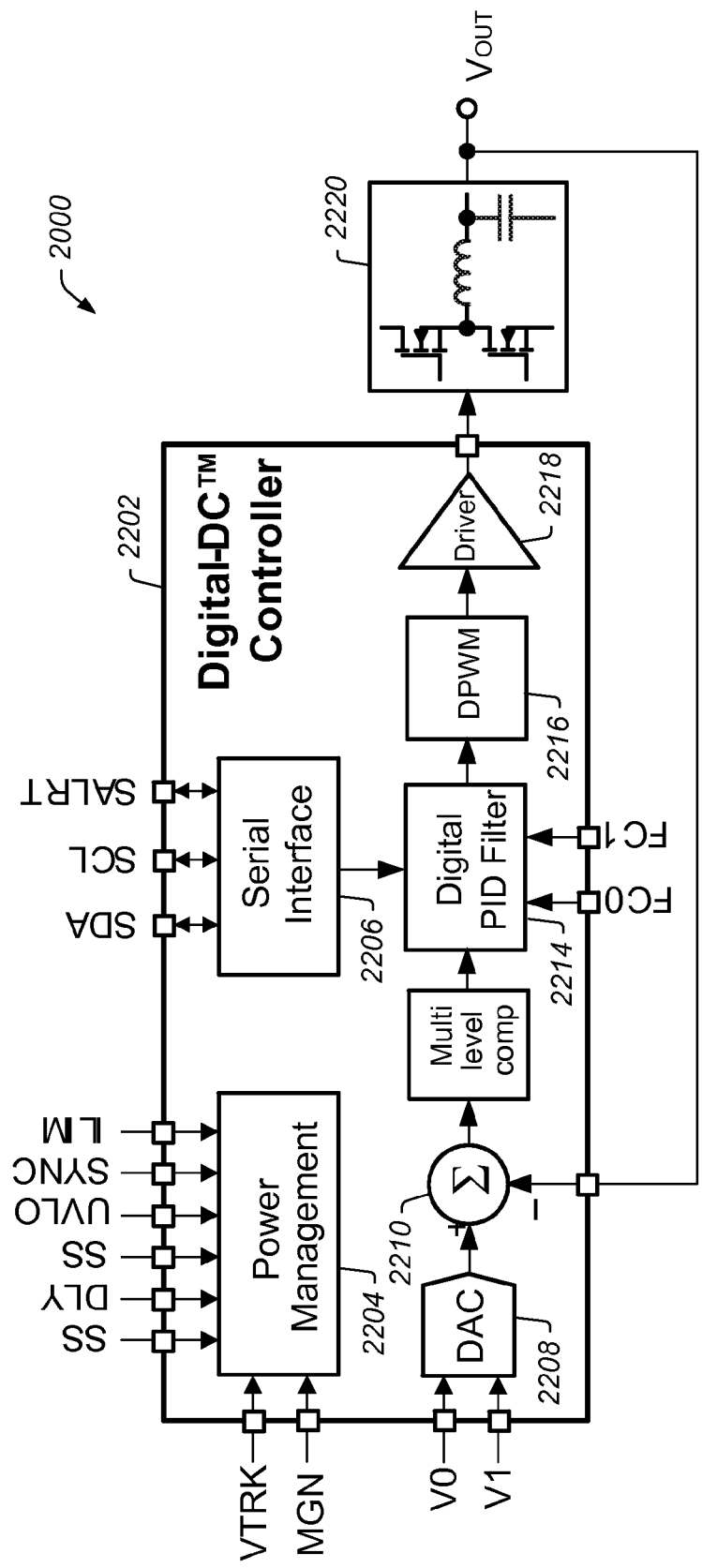
FIG. 22 shows one embodiment of a POL regulator comprising a control unit configured to perform regulation and power management functions.

For example, in one embodiment, as shown in FIG. 22, a point-of-load (POL) regulator 2000 may include a Controller 2202 and an output stage 2220 coupled together. Controller 2202 may be an integrated circuit, and output stage 2220 may comprise output switches, an inductor and a capacitor, to generate an output voltage of POL regulator 2000. Controller 2202 may include a power management unit 2204, a serial interface 2206, a digital-to-analog converter 2208, a pulse-width-modulated (PWM) control signal generating module 2216, driver circuitry 2218, and a digital filter, which may be a digital PID filter 2214. Controller 2202 may be configured to perform various power control functions and regulate the voltage output $V_{out}$ of the POL regulator through a feedback loop to summing element 2201, the feedback loop including digital filter 2214, PWM generator 2216, and driver circuit 2218. In one set of embodiments, Digital PID filter 2214 may be configured with the proper coefficients through serial interface 2206 and/or via pins FC0 and FC1.

Figure 23:
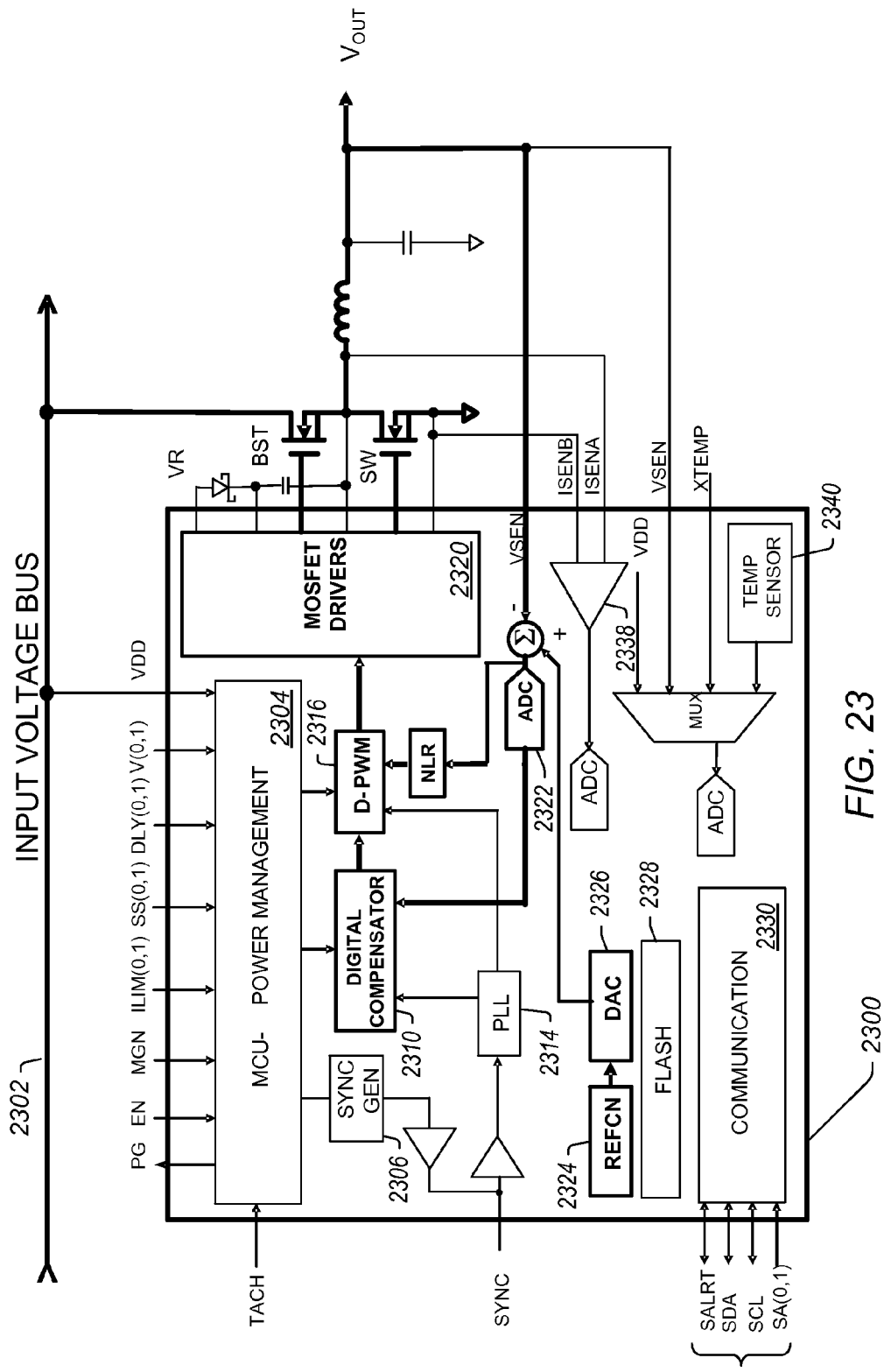
FIG. 23 shows a more detailed embodiment of the control unit shown in FIG. 22.

FIG. 23 shows a more detailed embodiment of the POL regulator 2000 from FIG. 22. As shown in FIG. 23, a Digital-DC-Controller chip may include a microcontroller 2304 configured to execute various algorithms directed at performing various power management functions, a digital compensator 2310, a PWM signal generator 2316, a sync signal generator 2306, a PLL 2314, an ADC 2322, a temperature sensor 2340, a communication interface 2330, a memory storage element 2328, which may be a flash memory, a register 2324, and MOSFET drivers 2320 for driving the high-side FET and low-side FET configured to generate the output $V_{out}$ of the POL regulator from an input voltage received through input voltage bus 2302. As indicated in the embodiment of the POL regulator shown in FIG. 23, a feedback control loop for controlling the output voltage $V_{out}$ and compensating the plant element of the POL regulator may be established via ADC 2322, which may convert $V_{out}$ into a digital value provided to digital compensator 2310, which may effect control of PWM generator 2316, which may itself control MOSFET drivers 2320. MCU 2304 may be configured to execute firmware directed at performing a variety of power management functions. For example, MCU 2304 may be configured to execute a variety of algorithms including adaptive frequency adjustment and/or diode emulation algorithms for optimizing the power efficiency of the POL regulator, load current monitoring, duty-cycle monitoring, etc.

Figure 24:
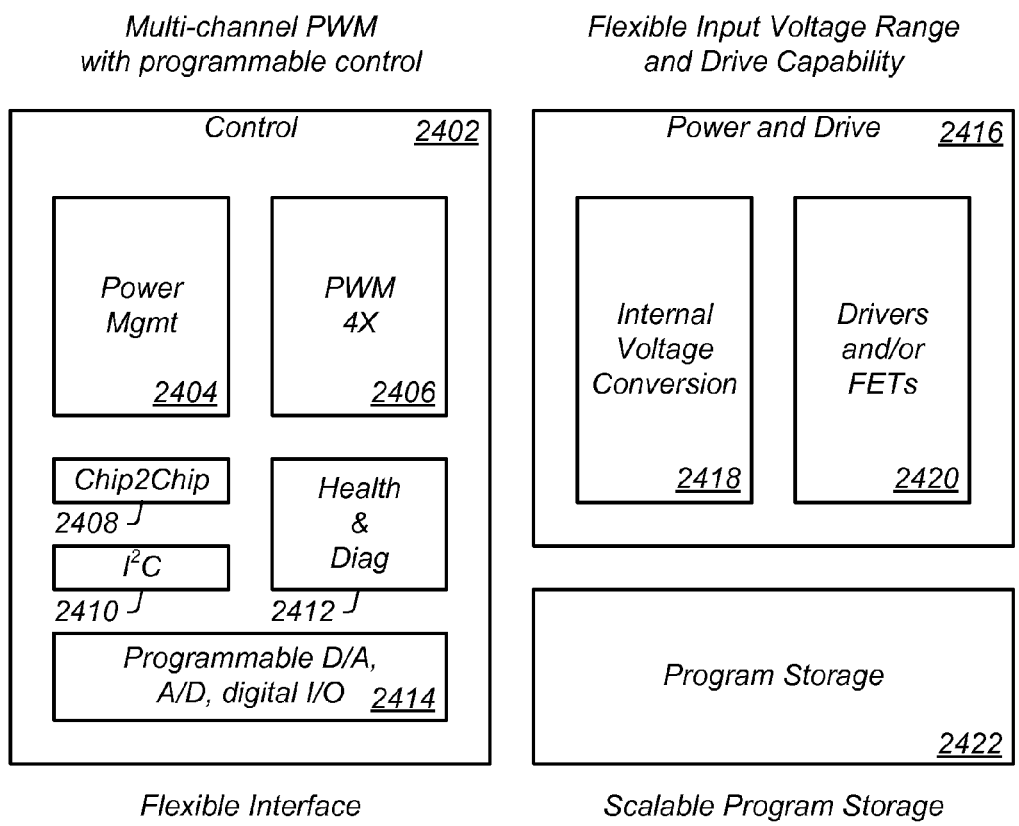
FIG. 24 shows a higher level block structure of one embodiment of a POL regulator divided into a programmable control unit, a power and drive unit, and a program storage unit.

FIG. 24 shows a higher level block structure of one embodiment of a POL regulator, which may be divided according to control and power/driver functionality. In one embodiment, a POL regulator may be partitioned into a control unit 2402 comprising power management functionality 2404, PWM control signal generation 2406, chip-to-chip 2408 and I²C 2410 communication, a diagnostic unit 2412, and programmable digital-to-analog converter, analog-to-digital converter and digital input/output block 2414. Thus, controller 2402 may operate as a pure control unit, with the power and drive block 2416 configured to interface with the output switches, inductor, and capacitor via drivers block 2420, although in some embodiments the switches (FETs) may also be included in block 2420. The power and drive section may further include internal voltage conversion circuitry 2418. Finally, the POL regulator may be configured with an independent storage element 2422, which may be configured to store various algorithms and programs executable by power management unit 2404 to perform various power management functions, including efficiency optimization, load current monitoring, adaptive frequency adjustment, diode emulation, and many others.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for configuring a digital compensator to stabilize a power stage circuit (plant), the method comprising:
    (a) determining a characteristic frequency of the plant;
    (b) determining a quality factor of the plant;
    (c) adjusting a frequency of the digital compensator to match the plant;
    (d) adjusting a quality factor of the digital compensator to match the plant;
    (e) adjusting a gain of the digital compensator to achieve desired phase margin and/or gain margin, and/or crossover frequency;
    (f) mapping the frequency of the digital compensator, the quality factor of the digital compensator and the gain of the digital compensator to a corresponding set of coefficients; and
    (g) configuring the digital compensator using the corresponding set of coefficients.

2. The method of claim 1, wherein (c), (d) and (e) are performed using a graphical user interface program.

3. The method of claim 1, wherein (a) and (b) are performed using a network analyzer to generate a Bode plot for the plant.

4. The method of claim 1, wherein (f) and (g) are performed by executing one or more automated algorithms.

5. The method of claim 1 further comprising:
    entering circuit components of the plant into a graphical user interface program a to obtain a graphical representation of the plant; and
    entering parameters corresponding to the components of the plant into the graphical user interface program;
    wherein (a) and (b) are performed based on said entering the circuit components and said entering the parameters.

6. A method for configuring a digital compensator to stabilize a power stage circuit (plant) according to a set of coefficients, using a graphical user interface program, the method comprising:
    entering circuit components of the plant to obtain a graphical representation of the plant;
    specifying parameter values corresponding to the components of the plant;
    selecting an optimization feature, wherein the optimization feature is configured to determine and assign respective values to the set of coefficients of the digital compensator, wherein the respective values assigned to the set of coefficients result in:
        matching a quality factor of the digital compensator to a quality factor of the plant;
        matching a frequency of the digital compensator to a frequency of the plant; and
        a desired phase margin, and/or a desired gain margin, and/or a desired cross-over frequency.

7. The method of claim 6, wherein the digital compensator is comprised in a control stage of a point-of-load (POL) regulator, and the plant is comprised in the POL regulator, wherein the control stage is configured to regulate an output voltage at an output of the plant;
    the method further comprising:
        providing the set of coefficients to the digital compensator; and
        the digital compensator compensating the plant.

8. The method of claim 7, further comprising the digital compensator adaptively compensating for changes in load current at the output of the plant.

9. A system comprising:
    a point-of-load (POL) regulator comprising:
        a power and drive stage configured to generate a regulated output voltage of the POL regulator; and
        a digital compensator configured to compensate the power and drive stage according to a set of coefficients; and
    a device configured to determine and assign respective values to the set of coefficients, and provide the set of coefficients to the POL regulator, wherein the respective values assigned to the set of coefficients result in:
        matching a quality factor of the digital compensator to a quality factor of the power and drive stage;
        matching a frequency of the digital compensator to a frequency of the power and drive stage; and
        a desired phase margin, and/or a desired gain margin, and/or a desired cross-over frequency.

10. The system of claim 9, wherein to determine the respective values for the set of coefficients, the device is configured to execute an algorithm to:
    set each coefficient of the set of coefficients to a specified respective value;
    measure a present standard deviation of a derivative of phase and/or gain with respect to frequency;
    compare the present standard deviation with a most recent previously measured standard deviation;
    update the specified respective value of each coefficient of the set of coefficients based on results of the comparison between the present standard deviation and the most recent previously measured standard deviation;
    wherein the device is further configured to execute the algorithm until the measured present standard deviation indicates that there is no longer a reduction of phase and/or gain deviation.

11. The system of claim 9, wherein the device is one of:
    a processor;
    a microcontroller; or
    a computer.

12. The system of claim 9, wherein the digital compensator comprises a digital proportional-integral-derivative (PID) filter.

13. The system of claim 9, further comprising a network analyzer configured to generate a Bode plot for the power and drive stage, to obtain a gain, a frequency, and an a quality factor of the power and drive stage,
    wherein the device is configured to determine the respective values for the set of coefficients based on the gain, the frequency, and an the quality factor of the power and drive stage.

* * * * *

UNITED STATES PATENT AND TRADEMARK OFFICE
CERTIFICATE OF CORRECTION

| | | |
|---|---|---|
| PATENT NO. | : 8,036,762 B1 | Page 1 of 1 |
| APPLICATION NO. | : 12/118166 | |
| DATED | : October 11, 2011 | |
| INVENTOR(S) | : Young et al. | |

It is certified that error appears in the above-identified patent and that said Letters Patent is hereby corrected as shown below:

Column 16
Line 38, please delete "previously measured standard deviation;" and substitute
--previously measured standard deviation; and--.

Signed and Sealed this
Twenty-second Day of November, 2011

David J. Kappos
*Director of the United States Patent and Trademark Office*